L. TROXLER.
MEASURING INSTRUMENT.
APPLICATION FILED MAR. 16, 1915.
1,172,645. Patented Feb. 22, 1916.
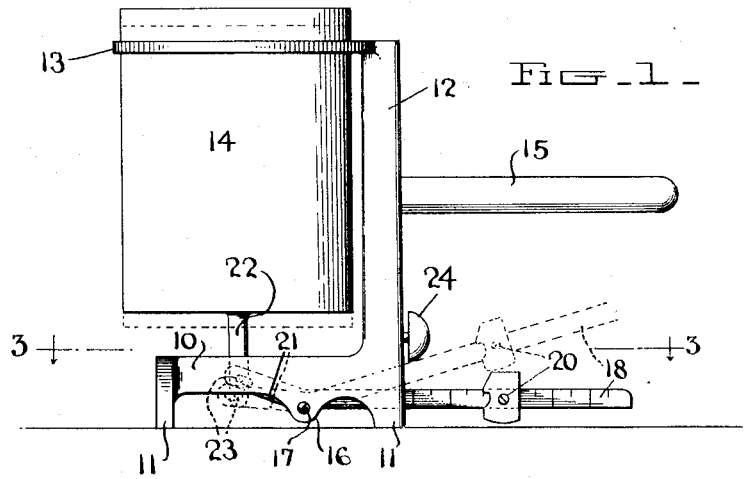
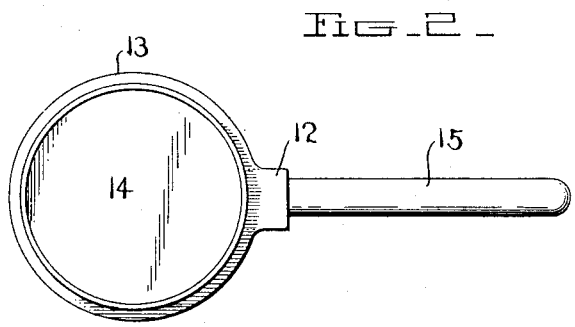
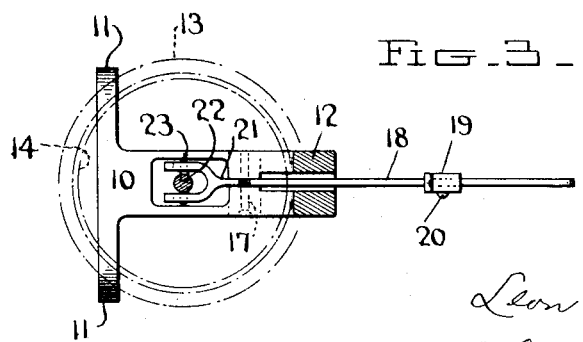

UNITED STATES PATENT OFFICE.

LEON TROXLER, OF NEW ORLEANS, LOUISIANA.

MEASURING INSTRUMENT.

1,172,645.  Specification of Letters Patent.  Patented Feb. 22, 1916.

Application filed March 16, 1915. Serial No. 14,796.

*To all whom it may concern:*

Be it known that I, LEON TROXLER, a citizen of the United States, residing at the city of New Orleans, in the parish of Orleans and State of Louisiana, have invented certain new and useful Improvements in Measuring Instruments, of which the following is a specification.

This invention relates to measuring instruments for the rapid and quick measurement of beer and other liquids or commodities.

One object is to provide a light, strong, durable and portable measuring device in which liquids or other commodities may be easily, quickly, and accurately measured.

Another object resides in the provision of a measuring instrument of the nature stated, embodying, among other characteristics, a vertically slidable receptacle having connection with a scale beam lever to operate the latter upon depression of the receptacle incident to the weight of the material placed therein, and cause the scale beam lever to move and coact with an alarm of a suitable character designed to indicate audibly when the desired quantity of material has been placed in the receptacle.

With these and other objects in view the invention consists in the construction and novel combination of parts hereinafter fully described, illustrated in the accompanying drawing, and pointed out in the claims hereto appended, it being understood that various changes in the form, proportion, size and minor details of construction, within the scope of the claims, may be resorted to without departing from the spirit or sacrificing any of the advantages of the invention.

In the drawing: Figure 1 is a side elevation of the invention. Fig. 2 is a top plan view. Fig. 3 is a transverse sectional view on the line 3—3 of Fig. 1.

Referring now more particularly to the accompanying drawings, the reference character 10 indicates a three legged base provided with supporting feet 11 and having a standard 12, to the upper end of which is secured an annulus 13 forming a guide for the vertical movement of the measuring receptacle 14, there being a handle 15 extending laterally from the standard 12 for the manipulation of the frame composed of the base and the annulus 13, so that the frame or base and the measuring receptacle 14, supported thereby, may be easily handled and moved from one place to another over a table, counter or the like.

The three legged base 10 is provided with a lug 16 to which is pivotally connected at 17 a scale beam lever 18 provided with graduations indicating the weight and coactive with which graduations, being slidable on the scale beam lever 18, is a weight 19, which may be held in adjusted positions on the lever 18 by means of a screw or other suitable fastening 20.

The scale beam lever 18 is provided with a short upwardly directed bifurcated extension 21, adapted to receive a projection 22 which depends from the bottom of the measuring receptacle 14, and which is pivotally connected at 23 in the bifurcated upwardly directed extension 21 of the scale beam.

The short upwardly directed extension 21 is shortest in leverage at the time that the receptacle 13 is in its elevated or full line position indicated in Fig. 1. When commodities are put into the receptacle 14, the receptacle moves downwardly, as shown in dotted lines, exerting force on the short extension 21 of the scale beam lever 18, and of course, consequent force exerted upon the short extension 21 of the scale beam lever causes the latter to assume a longer or more extended relation with reference to the pivot 17. The body of the scale beam lever 18 being normally in horizontal position, the weight is at its most distant position from the pivot when the receptacle is in its elevated position. Whenever the receptacle descends, the weight is raised with a consequent shortening of the length of the scale beam lever, as indicated in dotted lines in Fig. 1. This method of constructing and mounting the scale beam lever causes a very quick and positive action whenever the receptacle has received the required amount of liquid or other commodity.

When it is desired to measure a quantity of goods, the weight 19 is positioned according to the weight desired with relation to the graduations on the outer end of the scale beam lever 18. The material to be measured is then supplied to the receptacle 14 with a consequent downward movement of the receptacle 14 against the action of the scale beam lever 18, because of the connection of the receptacle 14 with the scale beam lever 18. In order that the attendant may know that the required amount of material has been placed in the receptacle 14, there is provided a bell 24 secured to the upright 12 or to any other suitable portion of the supporting frame, which is adapted to be engaged by the scale beam lever 18 at the proper time and thereby sound an alarm to indicate that the receptacle 14 has received the proper amount of material determined upon to be measured.

What is claimed is:

1. In a measuring instrument, a base provided with an upright, an annular guide at the upper end of the upright, a scale beam lever pivotally mounted on the base, a receptacle slidable in said annular guide and connected to said scale beam lever and supported thereby for sliding movement in said guide, and an alarm device connected to the upright for engagement by the scale beam lever to audibly indicate when the predetermined quantity of material has been placed in said receptacle.

2. In a measuring instrument, a base provided with an upright having a handle, a guiding device secured to the upper end of the upright, a scale beam lever pivotally secured to the base, a receptacle slidable in said guiding device and having a depending projection pivotally connected to the inner end of said scale beam lever, whereby the receptacle is supported for sliding movement in said guiding device by said lever, and an alarm device arranged to coact with said lever to audibly indicate when the predetermined quantity of material has been placed in the receptacle.

3. In a measuring instrument, a base, a scale beam lever pivotally connected to the base, a weight slidable on said lever, a receptacle slidably mounted above the base and depending for its support upon said lever, whereby upon depression of the receptacle incident to the weight of the material placed therein the inner end of the lever is depressed and the outer end thrown up, and an alarm disposed in the line of upward movement of the lever to audibly indicate when the predetermined quantity of material has been placed in the receptacle.

4. In a measuring receptacle of the character described, a base, a relatively long scale beam lever pivotally mounted adjacent one of its ends on said base, the shorter end of said lever being directed upwardly with relation to the remaining portion of the lever, a weight slidable on said lever, a receptacle slidably supported above the base and having connection with the upwardly extended portion of said lever, whereby upon downward movement of the receptacle incident to the weight of material placed therein the outer or longer end of the lever is swung upwardly on its pivot, and a device arranged in the path of upward movement of the longer portion of the lever for coaction with the latter to indicate when the predetermined amount of material has been placed in the receptacle.

In testimony whereof I have affixed my signature in presence of two witnesses.

LEON TROXLER.

Witnesses:
CHESTER W. BROWN,
H. J. LEDOUX.

Copies of this patent may be obtained for five cents each, by addressing the "Commissioner of Patents, Washington, D. C."